H. N. OTT & C. W. BARTON.
PROJECTION APPARATUS AND THE LIKE.
APPLICATION FILED JULY 31, 1912.
1,143,993.
Patented June 22, 1915.
4 SHEETS—SHEET 1.
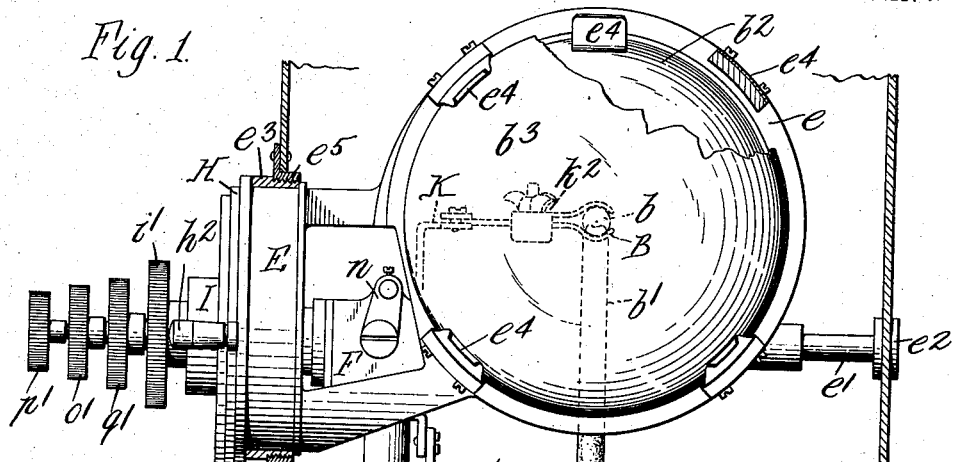
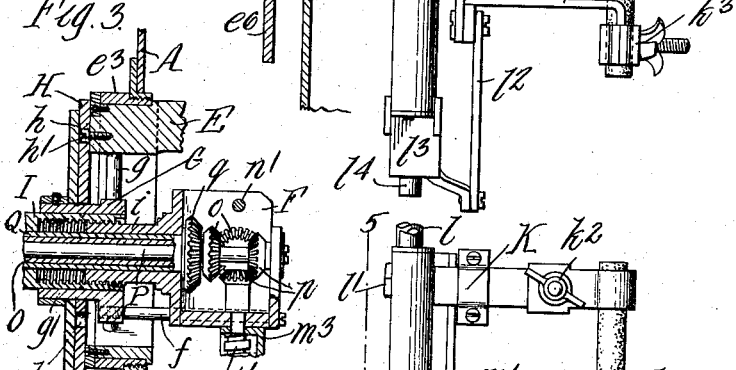
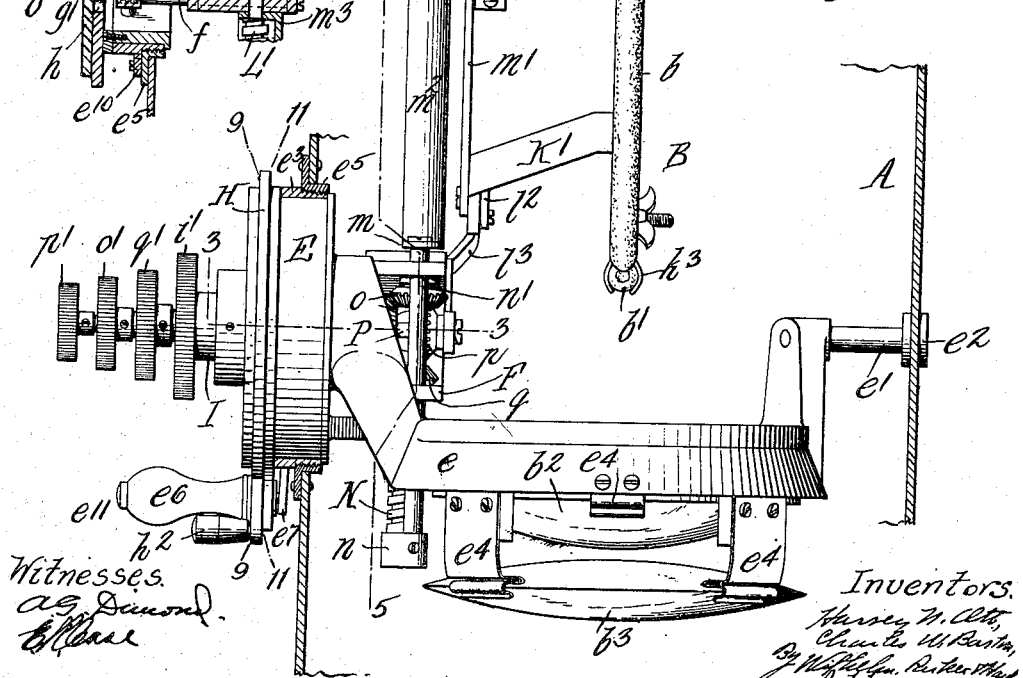
Witnesses.
Inventors.

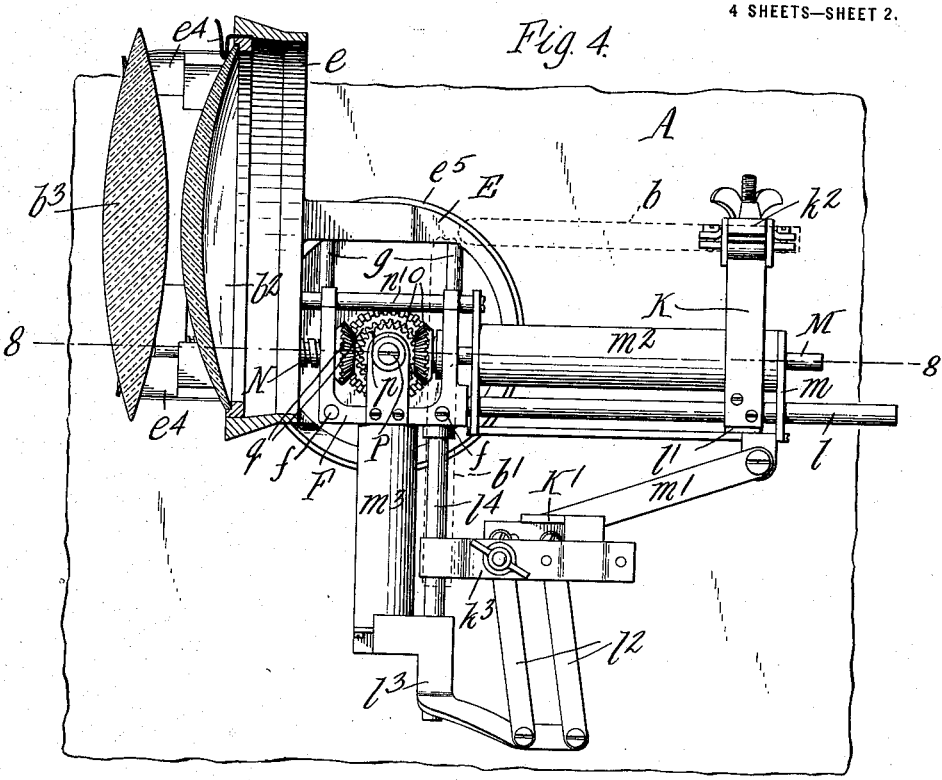
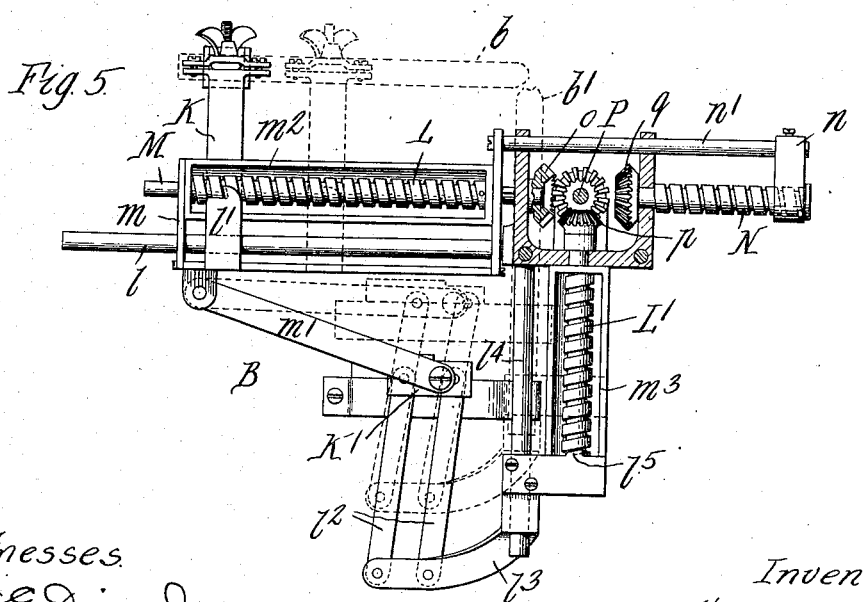

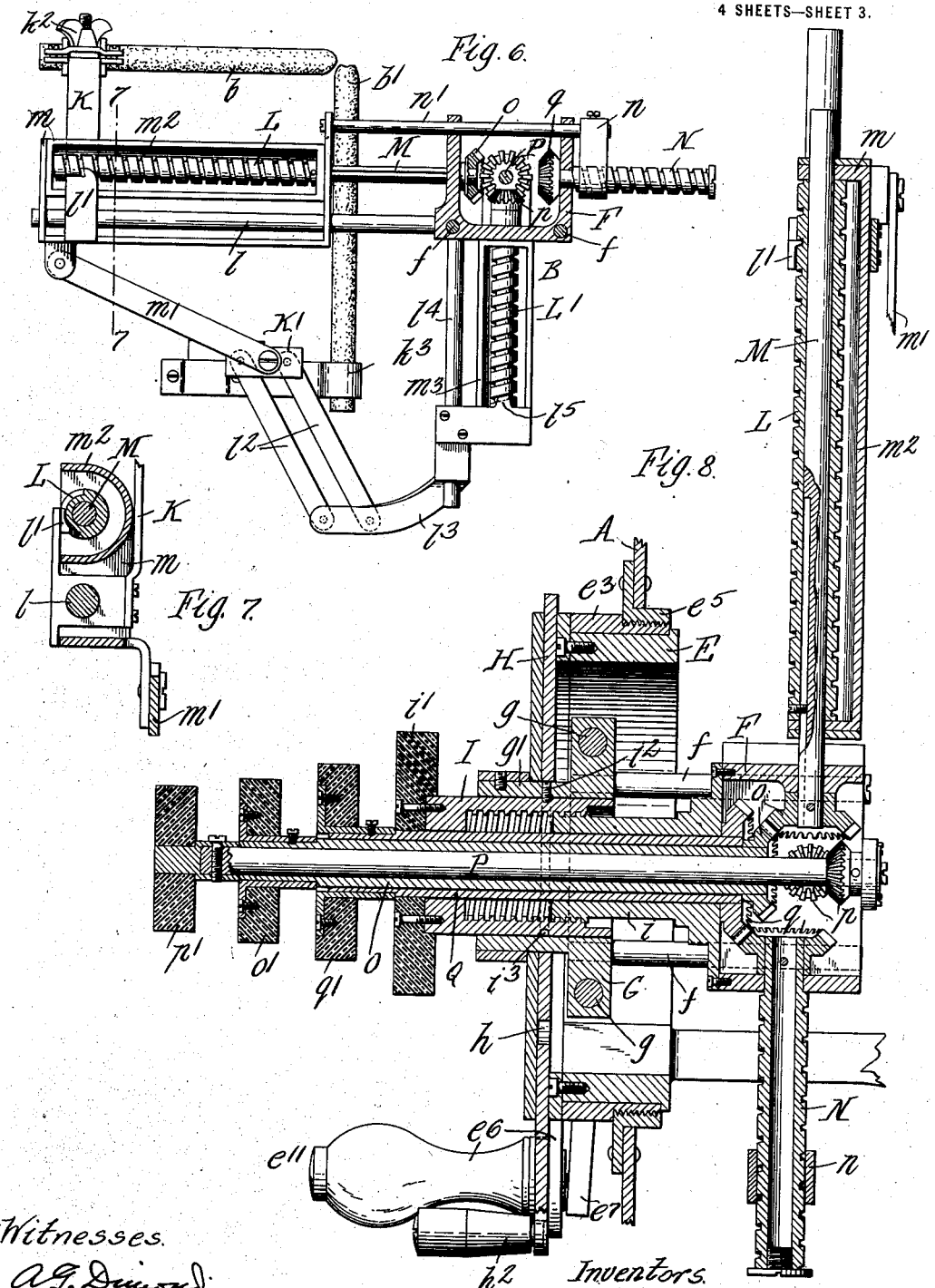

H. N. OTT & C. W. BARTON.
PROJECTION APPARATUS AND THE LIKE.
APPLICATION FILED JULY 31, 1912.
1,143,993.
Patented June 22, 1915.
4 SHEETS—SHEET 4.
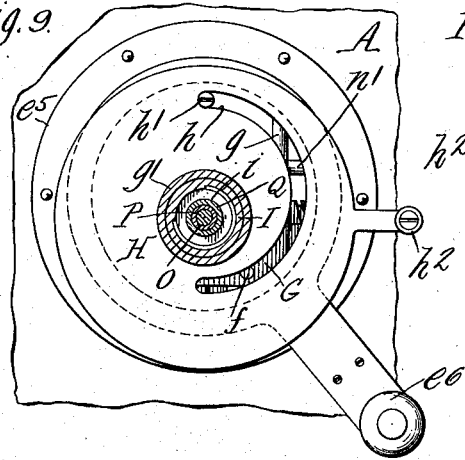
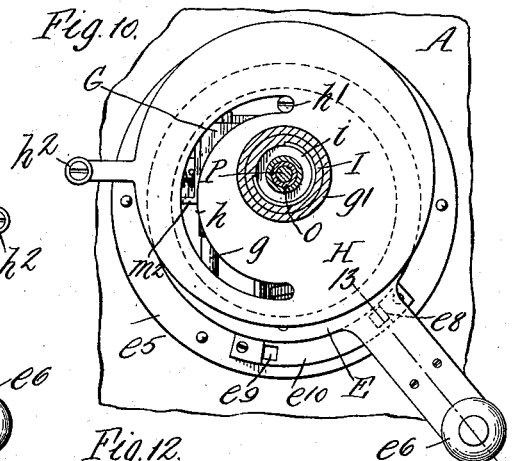
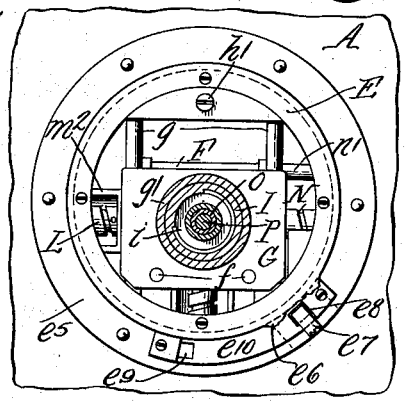
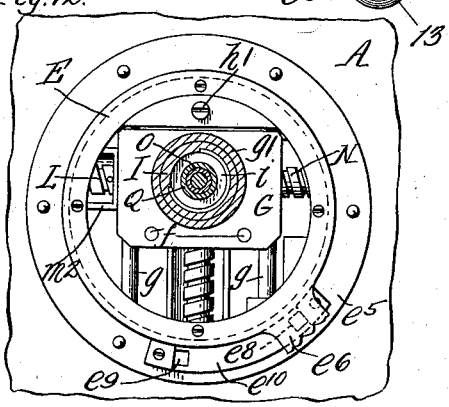
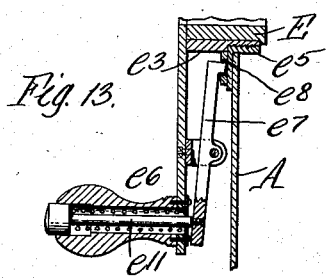
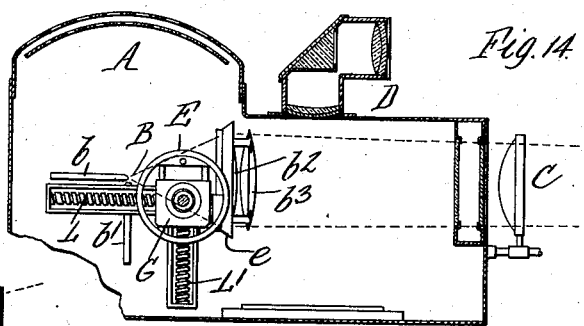
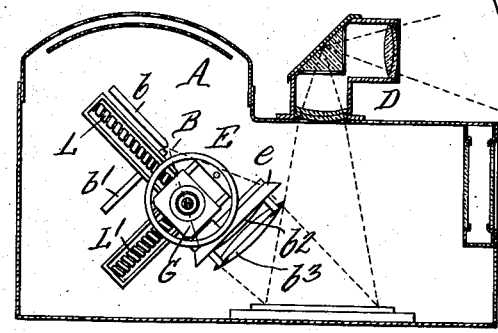
Inventors.
Harvey N. Ott,
Charles W. Barton,
By Wilhelm, Parker & Hart,
Attorneys.
Witnesses.

UNITED STATES PATENT OFFICE.

HARVEY N. OTT AND CHARLES W. BARTON, OF BUFFALO, NEW YORK, ASSIGNORS TO SPENCER LENS COMPANY, OF BUFFALO, NEW YORK.

PROJECTION APPARATUS AND THE LIKE.

1,143,993.  Specification of Letters Patent.  Patented June 22, 1915.

Application filed July 31, 1912.  Serial No. 712,412.

*To all whom it may concern:*

Be it known that we, HARVEY N. OTT, a citizen of the United States, residing at Buffalo, in the county of Erie and State of New York, and CHARLES W. BARTON, a subject of the King of Great Britain, residing at Buffalo, in the county of Erie and State of New York, have invented a new and useful Improvement in Projection Apparatus and the like, of which the following is a specification.

This invention relates to improvements in stereopticons or projection apparatus of the type adapted for producing different kinds of projections, as, for example, the projections of images of both transparent and opaque illustrations or objects.

More particularly the invention relates to mechanism for moving and adjusting the illuminating device or lamp into operative relation to a plurality of differently located projection objectives or devices.

The object of the invention is to produce a practical and desirable mechanism by which the lamp or illuminating device can be conveniently and easily shifted from one to another of its different operative positions and properly adjusted with reference to the several coöperating projection devices.

In the accompanying drawings, consisting of four sheets. Figure 1 is a front elevation, partly in section, of a lamp operating mechanism embodying the invention. Fig. 2 is a plan view, partly in section, thereof. Fig. 3 is a fragmentary sectional elevation thereof in line 3—3, Fig. 2. Fig. 4 is a longitudinal sectional elevation thereof. Fig. 5 is an elevation thereof partly in section in line 5—5, Fig. 2. Fig. 6 is a similar view showing a different adjustment of the lamp. Fig. 7 is a transverse section, on an enlarged scale, in line 7—7, Fig. 6. Fig. 8 is a horizontal section, partly in plan, on an enlarged scale, in line 8—8, Fig. 4. Figs. 9 and 10 are sectional elevations in line 9—9, Fig. 2, showing the parts in different positions. Figs. 11 and 12 are sectional elevations in line 11—11, Fig. 2, corresponding respectively to Figs. 9 and 10. Fig. 13 is a sectional elevation in line 13—13, Fig. 10, of the handle for swinging the lamp and the latch therefor. Figs. 14 and 15 are sectional elevations, on a reduced scale, of a projection apparatus showing different operative positions of the lamp.

Like reference characters refer to like parts in the several figures.

A represents the casing or light chamber of a projection apparatus and B an electric arc lamp which is pivotally mounted in the casing so that it can be swung to place it in either of the different positions shown in Figs. 14 and 15.

$b$ $b'$ indicate the carbons or pencils of the lamp, and $b^2$ $b^3$ condensing lenses therefor. In the position shown in Fig. 14, the lamp is in operative relation to the device C for one kind of projection, as for example, lantern slide work, and in the position shown in Fig. 15 the lamp is in operative relation to the objective D for another kind of projection, for instance opaque work.

This invention is not confined to any particular construction of the projection apparatus, arrangement of the different projection devices, or to the kind of projections to be produced, but is applicable generally to projection apparatus, or other apparatus in which a lamp or analogous device is required to be moved to different operative relations.

The lamp B is supported in the casing A so as to swing, as described, by a pivoted frame which, in the construction shown, consists of a lens supporting ring $e$ which extends cross-wise of the casing A and is provided at one side with a pivot or axle $e'$ adapted to turn in a bearing $e^2$ in the adjacent wall of the casing A, and at the opposite side with a large pivot ring E adapted to turn in a suitable stationary ring or bearing $e^3$ in the adjacent wall of the casing A.

The condensing lenses $b^2$ $b^3$ can be mounted on the supporting ring $e$ by the spring clips $e^4$ shown, or in any other suitable way.

As shown, the bearing ring $e^3$ is screwed into a flanged collar $e^5$ fixed in an opening in the wall of the casing A, and the pivot ring E is held from endwise movement in the bearing ring $e^3$ by fixed and removable flanges at the ends thereof (see Fig. 8). The entire lamp and its operating mechanism are carried by the rotatable pivot ring E, and while the lens ring $e$ having the pivot $e'$ at the opposite side of the casing is preferably employed to relieve the pivot ring E and its bearing from strain, it is not essential to the invention and could be dispensed with, the lenses $b^2$ $b^3$ being supported in any other suitable way.

A suitable handle $e^6$ is provided on the pivot ring E outside of the casing for turning it to swing the lamp. A spring-actuated latch $e^7$, Fig. 13, is shown on the handle adapted to enter notches $e^8$ $e^9$, Fig. 11, in a segment plate $e^{10}$ on the casing A for securing the lamp in its operative positions. The latch is released by a spring-pressed push pin or plunger $e^{11}$ extending through the handle $e^6$. The pivot ring can be journaled in any other suitable way and provided with any suitable handle or holding means.

F represents a carriage or frame which supports the lamp B and is movable horizontally transversely in the casing A on a second supporting frame or carriage G which, in turn, is movable vertically in the pivot ring E. As shown, the carriage F is arranged to slide on horizontal guide rods $f$ fixed to and projecting inwardly from the vertically movable frame G, and the frame G is arranged to slide on vertical guide rods $g$ fixed in the pivot ring E. The vertically movable frame G has a tubular hub $g'$ which projects through and bears in a circular hole in an adjusting plate or cam H. This plate has a cam or eccentric slot $h$ through which passes a stud $h'$ secured to the pivot ring E so that the carriage G and the parts carried thereby can be adjusted vertically to any required elevation and there supported by turning the adjusting plate H to the necessary extent by means of a handle $h^2$ provided thereon for the purpose.

The carriage F is adjusted horizontally on the guide rods $f$ preferably by a screw-threaded sleeve or nut I which turns in the hub $g'$ of the frame G and engages a tubular screw-threaded extension $i$ of the carriage F. The adjusting nut I is provided at its outer end with a head or handle $i'$ for turning it and is held from endwise movement in the hub by any suitable means, such for instance as a screw or pin $i^2$ projecting from the latter into a circumferential groove $i^3$ in the sleeve.

The carbon pencils $b$ $b'$ of the lamp B are arranged at right angles or respectively horizontally and vertically and are secured in horizontally and vertically adjustable holders K K', respectively by suitable clamps or securing devices $k^2$ $k^3$. In the construction shown, the holder K is arranged to slide on a horizontal guide rod $l$ projecting from the carriage F and is adjusted thereon by a screw L engaging an arm or part $l'$ on the holder, and the other holder K' is mounted on parallel swinging links $l^2$ pivoted to a bracket or arm $l^3$ which is arranged to slide on a vertical rod $l^4$ depending from the carriage F and is adjusted thereon by a screw L' engaging an arm or part $l^5$ on the bracket $l^3$.

The screw L is sleeved on a shaft M between the ends of a frame or yoke $m$ also arranged to slide on the guide rod $l$, and is splined to the shaft M so that it turns with the shaft but is adapted to slide thereon with the yoke $m$. Thus the holder K can be adjusted horizontally in the yoke or frame $m$ by turning the shaft M and screw L, and the holder can also be adjusted horizontally by moving the yoke or frame $m$, since the screw will be caused to slide on the shaft M and move the holder K with it when the yoke or frame $m$ is moved. A link $m'$ pivoted to the yoke $m$ and to the holder K' causes the holder to move horizontally with the yoke or frame, so that by moving the yoke or frame $m$ the holders K and K' for the horizontal and vertical carbons are simultaneously adjusted horizontally while the required adjustment of the carbons relative to each other is effected by turning the screws L and L'.

The shaft M is journaled in the carriage F and in the yoke $m$ and the screw L is preferably protected from the heat of the arc by a shield $m^2$ partially surrounding the screw, while the screw L' is journaled in the carriage F and is preferably protected from the heat by a similar shield $m^3$.

The yoke or frame $m$ is adjusted horizontally by a screw N which is journaled in the carriage F and engages an arm or part $n$ secured to a rod $n'$ which is fixed to the yoke or frame $m$ and slides in guide holes in the carriage.

The adjusting screw L is connected through the shaft M, by bevel gears $o$ $o$ to an operating shaft O; the screw L' is connected by bevel gears $p$ $p$ to an operating shaft P; and the adjusting screw N is connected by bevel gears $q$ $q$ to an operating shaft Q. These three shafts O P and Q are arranged one within another and extend through the tubular extension $i$ of the carriage F concentrically with the supporting pivot ring E for the lamp, and are provided at their outer ends, exterior to the casing A, with wheels or handles $o'$, $p'$ and $q'$, respectively, for turning them. This arrangement permits any one or more of the adjusting screws L L' and N to be operated without interfering with the rotation of the pivot ring E for swinging the lamp from one to the other of its operative positions, or with the vertical adjustment of the lamp by the cam plate H.

The described mechanism enables the lamp to be adjusted vertically and horizontally, transversely of the casing, to place the light in the optical axis by actuating the cam plate H and the nut I, and to be adjusted in the optical axis toward and from the condensing lenses $b^2$ and $b^3$ to properly focus it by turning the operating shaft Q for the adjusting screw N, while the necessary adjustments of the carbons relative to each other can be effected by turning the operating shafts O and P for the adjusting screws L and L', and the lamp can be swung from one to the other of its operative positions by turning the pivot ring E by its handle $e^6$. This mechanism is compact and simple in construction and places all of the operating handles or devices in a convenient location close together outside of the casing A at one side thereof where they can be readily reached and actuated.

The concentrically arranged adjusting shafts O P and Q could be operatively connected to the adjustable parts for adjusting them in the manner described, by mechanism of other construction without departing from this invention.

In an apparatus in which the lamp does not have carbons requiring adjustment relative to each other, the mechanism described for adjusting the lamp laterally and vertically to place it in the optical axis, for focusing it, and for swinging it from one to the other of its operative positions, would be useful without the independent carbon adjusting means.

We claim as our invention:

1. The combination with a lamp pivotally mounted to swing to different operative positions, of mechanisms for respectively adjusting the lamp longitudinally, transversely and vertically, said mechanisms being constructed and arranged to permit the swinging of the lamp and being operative in the different operative positions of the lamp.

2. The combination with a lamp pivotally mounted to swing to different operative positions, of mechanisms for respectively adjusting the lamp longitudinally, transversely and vertically, said mechanisms having actuating members arranged substantially concentric with the pivotal axis of the lamp.

3. The combination with a lamp pivotally mounted to swing to different operative positions, of mechanisms for respectively adjusting the lamp longitudinally, transversely and vertically, said mechanisms having actuating members arranged substantially concentric with relation to each other and to the pivotal axis of the lamp.

4. The combination with a lamp pivotally mounted to swing to different operative positions, of mechanisms for respectively adjusting the lamp longitudinally, transversely and vertically, said mechanisms having adjusting devices which swing with the lamp, and actuating members which are arranged substantially concentric with the pivotal axis of the lamp.

5. The combination with a lamp, of a pivoted supporting frame therefor, a frame which is carried by and adjustable vertically on said pivoted frame, a carriage which is adjustable transversely on said vertically adjustable frame, said lamp being adjustable longitudinally on said carriage, and mechanisms for effecting said several adjustments.

6. The combination with a lamp, of a pivoted supporting frame therefor, a frame which is carried by and adjustable vertically on said pivoted frame, a carriage which is adjustable transversely on said vertically adjustable frame, said lamp being adjustable longitudinally on said carriage, and adjusting mechanisms for effecting said several adjustments having actuating members arranged substantially concentric with the pivotal axis of said pivoted frame.

7. The combination of a swinging frame having a pivot ring, a frame movable vertically in said pivot ring, adjusting means therefor, a carriage movable transversely on said vertically movable frame, adjusting means therefor, a lamp carried by said carriage, and means for adjusting the lamp longitudinally on said carriage.

8. In a projection apparatus, the combination with a casing and a lamp adjustably mounted in said casing, of mechanisms for adjusting the lamp in planes substantially parallel with and perpendicular to the axis of said apparatus, and actuating members for said mechanisms extending to the exterior of the casing.

9. In a projection apparatus, the combination with a lamp pivotally mounted to swing to different operative positions, of mechanisms for swinging the lamp on its pivot, and for adjusting the lamp in planes substantially parallel with and perpendicular to the axis of said apparatus, and actuating members for said mechanisms extending to one side of the apparatus and being operative in different operative positions of the lamp.

10. In a projection apparatus, the combination with a lamp pivotally mounted to swing to different operative positions, of mechanisms for respectively adjusting the lamp transversely and vertically in said apparatus, said mechanisms having actuating members arranged substantially concentric with the pivotal axis of the lamp.

11. In a projection apparatus, the combination of a casing, a frame adjustable vertically with regard to said casing, a carriage adjustable transversely on said adjustable frame, a lamp adjustable longitudinally of the apparatus on said carriage, and adjusting mechanisms for effecting said several adjustments having actuating members arranged substantially concentric with regard to each other.

12. In a projection apparatus, the combination with a lamp pivotally mounted to swing to different operative positions, of mechanisms for swinging the lamp on its pivot, and for adjusting the lamp in planes substantially parallel with and perpendicular to the axis of said apparatus, and actuating members for said mechanisms arranged substantially concentric with regard to each other.

13. In a projection apparatus, the combination of a supporting frame, a frame vertically adjustable with regard to said supporting frame, a lamp movably mounted on said adjustable frame, and a cam member having parts engaging said supporting frame, and said adjustable frame for moving the adjustable frame.

14. In a projection apparatus, the combination of a pivoted supporting frame, a frame which is carried by and adjustable vertically on said pivoted frame, a lamp movably mounted on said adjustable frame, and a cam member having parts engaging said adjustable frame and said pivoted frame for moving said adjustable frame relatively to said pivoted frame.

15. In a projection apparatus, the combination of a supporting frame, a frame adjustable relatively to said supporting frame, a lamp movably mounted on said adjustable frame, and an actuating member for said adjustable frame rotatably mounted on said adjustable frame, said actuating member having a cam face adapted to engage a part of said supporting frame, whereby the turning of said actuating member about said adjustable frame causes the adjustable frame to be shifted relatively to said supporting frame.

16. In a projection apparatus, the combination of a supporting frame, a frame adjustable relatively to said supporting frame, a lamp movably mounted on said adjustable frame, an actuating member for said adjustable frame rotatably mounted on said adjustable frame, said actuating member having a cam face adapted to engage a part of said supporting frame, whereby the turning of said actuating member about said adjustable frame causes the adjustable frame to be shifted relatively to said supporting frame, and adjusting mechanisms for moving said lamp relatively to said adjustable frame, said adjusting mechanisms having parts arranged substantially concentric with the axis of rotation of said actuating member.

17. In a projection apparatus, the combination of a supporting frame, a frame adjustable relatively to said supporting frame and having a hub, an actuating member engaging said hub and said supporting frame for adjusting said adjustable frame vertically, a lamp movably mounted on said adjustable frame, and adjusting mechanisms for moving said lamp relatively to said adjustable frame, said mechanisms having actuating members arranged concentrically within said hub.

18. In a projection apparatus, the combination of a supporting frame, a frame adjustable relatively to said supporting frame and having a hub, an actuating member engaging said hub and said supporting frame for adjusting said adjustable frame vertically, a carriage movable relatively to said adjustable frame, a lamp movably mounted on said carriage, and adjusting mechanisms for moving said lamp and said carriage, said mechanisms having actuating members extending through said hub.

19. In a projection apparatus, the combination of a pivoted supporting frame, means for adjusting said supporting frame about its pivot, a frame adjustably mounted on said supporting frame, a lamp movably mounted on said adjusting frame, an actuating member for said adjustable frame rotatably mounted on said adjustable frame and having a cam face engaging a part of said supporting frame, and adjusting mechanism for moving said lamp relatively to said adjustable frame, said mechanism having parts arranged substantially concentric with the axis of rotation of the actuating member.

20. In a projection apparatus, the combination of a pivoted supporting frame, means for adjusting said supporting frame about its pivot, a frame adjustably mounted on said supporting frame and having a hub, an actuating member engaging said hub and said supporting frame for adjusting said adjustable frame vertically, a lamp movably mounted on said adjustable frame, and adjusting mechanisms for moving said lamp relatively to said adjustable frame, said mechanisms having actuating members arranged concentrically within said hub.

Witness our hands, this 26th day of July, 1912.

HARVEY N. OTT.
CHAS. W. BARTON.

Witnesses:
CORA FACKLAM,
LOUIS M. POTTER.